United States Patent [19]
Kenny et al.

[11] 3,842,842

[45] Oct. 22, 1974

[54] LONG LIFE IMPLANTABLE CARDIAC PACER GENERATOR AND METHOD OF CONSTRUCTION

[76] Inventors: John Kenny, 4 Hobb's Way; Alan Wilds, 36 Newfields, both of Welwyn Garden City, Hertfordshire, England

[22] Filed: Sept. 22, 1972

[21] Appl. No.: 291,358

[30] Foreign Application Priority Data
Sept. 24, 1971 Great Britain.................. 44741/71

[52] U.S. Cl............................. 128/419 P, 29/592
[51] Int. Cl............................................ A61n 1/36
[58] Field of Search.......... 128/419 P, 419 B, 419 C, 128/419 E, 419 R; 3/DIG. 3; 29/592, 596

[56] References Cited
UNITED STATES PATENTS

| | | | |
|---|---|---|---|
| 2,914,600 | 11/1959 | Smith et al........................... | 29/596 |
| 3,253,595 | 5/1966 | Murphy, Jr. et al............. | 128/419 P |
| 3,396,409 | 8/1968 | Melrose.............................. | 3/DIG. 3 |
| 3,598,128 | 8/1971 | Chardack........................ | 128/419 P |
| 3,683,932 | 8/1972 | Cole.................................. | 128/419 P |
| 3,690,325 | 9/1972 | Kenny.............................. | 128/419 P |

FOREIGN PATENTS OR APPLICATIONS 1,379,684    10/1964    France............................ 128/419 P

OTHER PUBLICATIONS

"Medical Instrumentation", Vol. 7, No. 1, Jan–Feb. 1973, p. 22.

*Primary Examiner*—William E. Kamm
*Attorney, Agent, or Firm*—Wenderoth, Lind & Ponack

[57] ABSTRACT

An improved, long life implantable cardiac pacer generator and method of construction are disclosed. The pacer generator has a housing formed of two moulded sections of plastic material, the two sections being brought together and sealed as by welding or the use of solvent or adhesive at the interface, the sealed housing defining one or more cavities which house the pacer components. Polypropylene is the preferred plastic material and sealing is preferably by ultrasonic welding.

10 Claims, 6 Drawing Figures

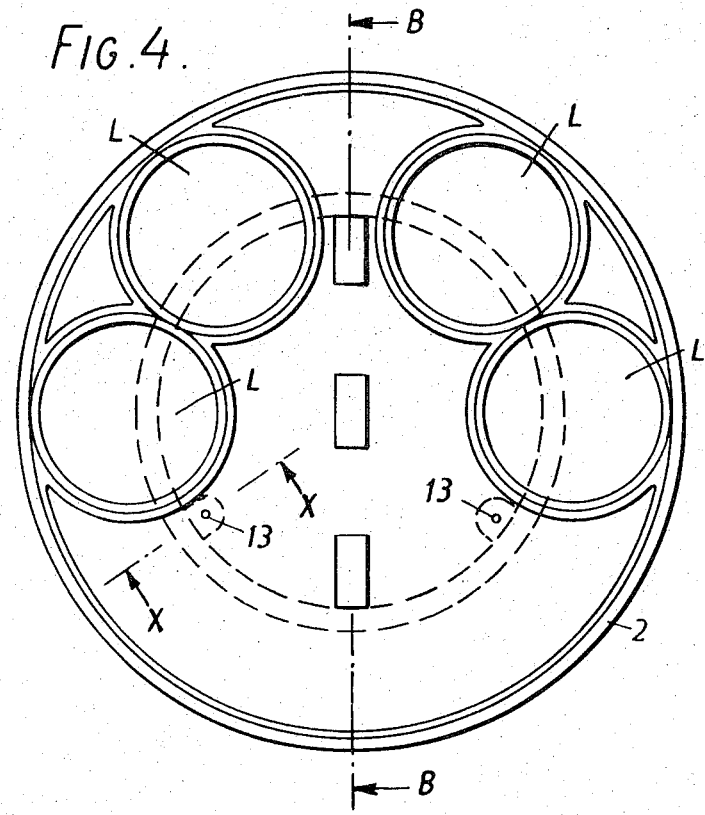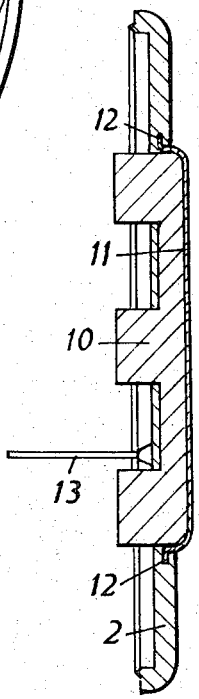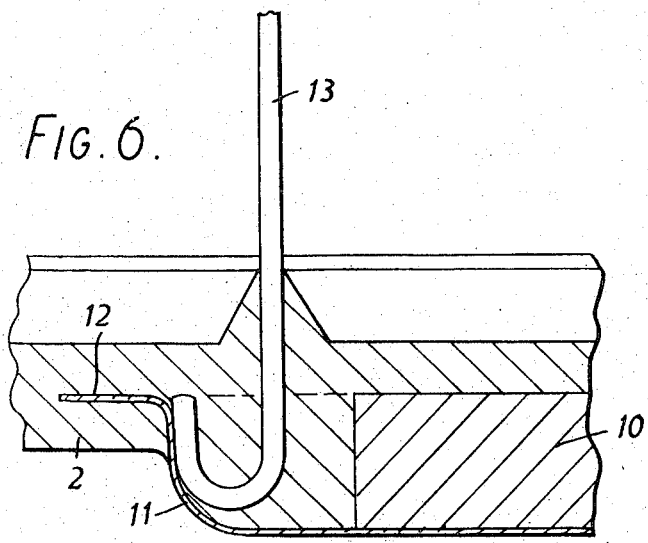

LONG LIFE IMPLANTABLE CARDIAC PACER GENERATOR AND METHOD OF CONSTRUCTION

The invention relates to an implantable cardiac pacer generator and a method of constructing such a pacer generator.

Hitherto, the shortcomings of power sources used to drive implantable cardiac pacer generators have required replacement of the pacer generator by surgical operation normally within two years. However, improved power sources are becoming available, as exemplified by aluminium/air cells and even nuclear powered cells. Therefore, longer life is envisaged for the pacer generator and problems of physical deterioration of the pacer generator become more important. One of the major problems is associated with ingression of moisture to the pacer generator circuitry and particularly the batteries. An object of the invention is to provide a pacer generator which has an improved and simple method of construction and which may have improved resistance to the ingression of moisture.

According to one aspect of the invention there is provided an implantable cardiac pacer generator having a housing formed of two moulded sections of plastic material, the two sections being brought together and sealed as by welding or the use of solvent or adhesive at the interface, the sealed housing defining one or more cavities which house the pacer generator components.

According to another aspect of the invention there is provided a method of construction of an implantable cardiac pacer generator, the method consisting in moulding two sections of plastic material on a metal electrode connecting block and connectors while forming cavities in the moulding, mounting pacer generator components in the cavities, bringing the two sections together and sealing them as by welding or by the use of solvent or adhesive at the interface; the connecting block and an indifferent electrode being positioned for making external contact.

The preferred method of sealing is by welding by the application of ultrasonic energy, although satisfactory results can be achieved by heat welding using a welding rod of the same plastics material.

The requirements for the plastic material are stringent and a particularly useful material has been found by trial to be that manufactured by Imperial Chemical Industries under the name Propathene (Registered Trade Mark) PXC3311, a grade of polypropylene. The advantages of this material are that it is easily moulded and welded and has very low permeability to moisture.

Preferably the cavities are moulded in at least one of the two sections and preferably they are adapted to accept the various circuit components of the pacer generator including the batteries. In this way the only external lead connection required is for the active electrode which makes contact with the heart muscle for monitoring natural heart action and applying stimulating pulses. The active electrode may be moulded into one of the sections or alternatively there may be provided a terminal block moulded into one of the sections whereby external connection can be made for the active electrode.

After the two sections have been welded together it is preferred to metallise the external surface of the housing in order to reduce the effects of electrical interference signals on the functioning of the circuit. The metal must be biologically compatible with the body and essentially this restricts the choice to metals or alloys of the group consisting of titanium, hafnium, zirconium, platinum, iridium, osmium and palladium. Preferably palladium is used since its electrical properties are virtually the same as platinum and palladium is cheaper.

The method of application of the metallised layer may be by vacuum evaporation, cathode sputtering, chemical vapour deposition, metal spraying, conductive painting and electroless deposition followed by conventional electroplating.

The preferred methods are those of vacuum evaporation, cathode sputtering and electroplating.

After the outer surface of the housing has been metallised it is preferred to apply an outer coating of cold cured silicone rubber. This helps to protect the metal coating.

The invention will further be described with reference to the accompanying drawings, which show the housing of a cardiac pacer generator in accordance with the invention, the housing comprising a base and a complementary lid. In the drawings, FIG. 1 is a plan view of the base of the housing;

FIG. 4 is a plan view of the lid of the housing;

FIG. 5 is a cross-sectional view taken at 'B—B' of FIG. 4; and

FIG. 6 is an enlarged part cross-section taken at 'X—X' of FIG. 4.

Figure 1:
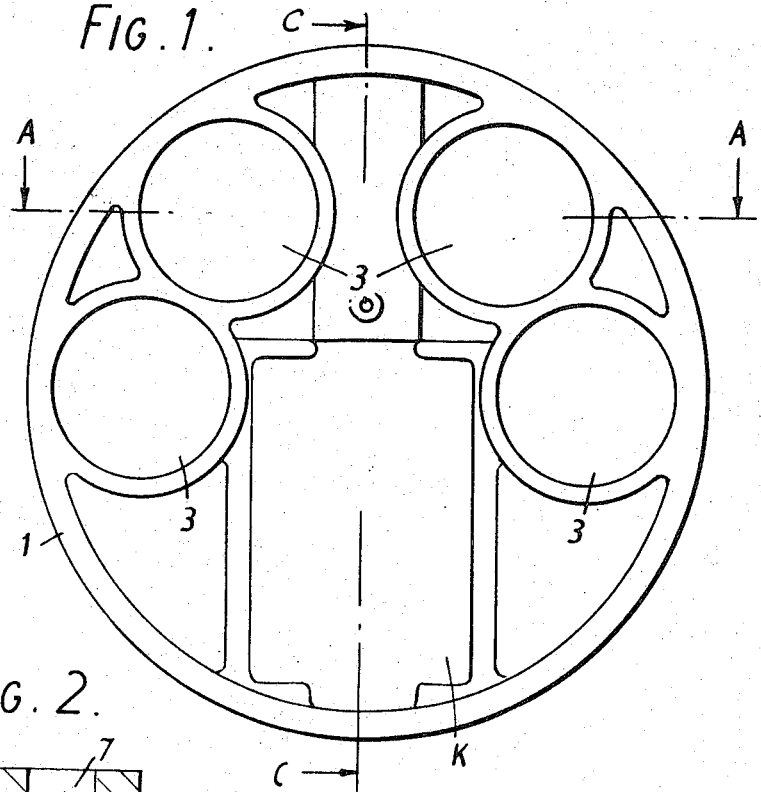
Figure 2:
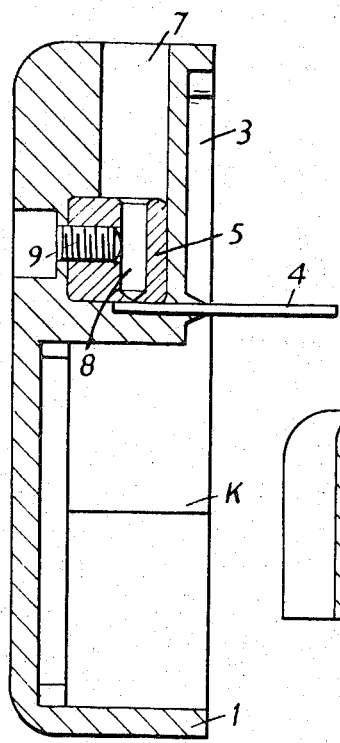
FIG. 2 is a cross-sectional view taken at 'C—C' of FIG. 1.
Figure 3:
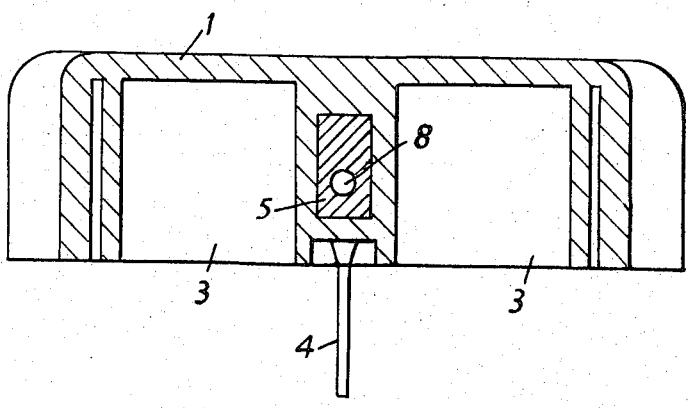
FIG. 3 is a cross-sectional view taken at 'A—A' of FIG. 1.

Referring to the drawings the base 1 of FIGS. 1 to 3 and the lid 2 of FIGS. 4 to 6 are circular mouldings of "Propathene" (Registered Trade Mark) PXC3311. The base 1 has a cavity K which, in use, houses the transistorised pacer circuitry. Also provided are four circular cavities 3 which house four Mallory mercury cells connected in series to supply power to the circuitry. A metal insert 4 is moulded into the base and a metal connector block 5 makes contact therewith. The end of a catheter (not shown) is received in a bore 7 and the end of a connector within the catheter is received in a bore 8 in block 5. The connector is locked in contact in bore 8 by means of a grub-screw (not shown) located in a threaded bore 9 in block 5. The other end of the catheter carries the exposed active electrode which makes contact with the heart muscle and output pulses from the pacer generator circuitry are applied to the active electrode via the catheter lead, block 5 and insert 4 to which the pacer circuitry output is connected in use. If the pacer is a fixed rate pacer only output pulses will be carried by the catheter lead. However, the pacer may be a demand pacer which requires input pulses from the natural action of the heart. Such natural biological pulses may be fed back to the pacer circuitry from the active electrode via the catheter lead.

Referring now to FIGS. 4 to 6 the lid has four cavities L corresponding to cavities 3 in the base for accommodating the cells. The cavities K and 3 in the base are shallower than the components which they house so that the components stand proud of the flat upper surface of the base. The protruding portions of the cells are housed in the cavities L. The protruding portion of the pacer circuitry is housed in the space surrounded by cavities L.

The central circular part of the lid 2 is pre-formed as an inset 10 on to which the remainder of the lid is moulded. The outer surface of the inset 10 is covered by a circular platinum dish 11 having flanges 12 which are moulded into the remainder of the lid. The platinum dish 11 is the indifferent, or earth return electrode of the circuit which represents the base potential level with respect to which the output pulses at the active electrode are measured. The indifferent electrode makes contact with the body of the patient at the site of the pacer. In order to connect the indifferent electrode to the pacer generator circuitry two pins 13 are provided. The pins are set in place in contact with dish 11 before moulding the main part of the lid and are then moulded in place as shown in FIG. 6.

When the pacer generator circuitry and cells have been located in their respective cavities in the base 1 the two sections are joined together by welding. A preferred welding method consists in maintaining the internal faces of the base and the lid in close contact and in a fixed position by jigging and then applying an ultrasonic source to give a welded bond by ultrasonic heating. This can be achieved in a fraction of a second. By the correct location of energy directors the seal can be made effective along all the interfaces.

Alternatively the welding may be effected by using heat and this is a two-stage procedure. Firstly, the internal faces of the base and the lid are held against a specially shaped hot plate with a polytetrafluorethylene finish until the surface plastic becomes molten. The parts are now removed from the plate and rapidly placed together under slight pressure until cooling has been effected. This process gives a good internal seal along all the faces. The edge is then sealed as the second phase of the operation. The design of the edge for this method of sealing incorporates a groove of ⅛ inch dia. Using a hot gas welding gun with nitrogen and ⅛ inch dia. polypropylene rod the edge is sealed.

Next, the housing is metallised. Palladium is used and although it is possible to deposit the metal by electroless deposition followed by electroplating it is preferred to use vacuum evaporation. The palladium is provided in a form of 0.0009 purity palladium wire of 0.5mm dia. A power of 150 watts is applied to the palladium under a vacuum of $10^{-9}$ torr and a coating is thus attained on the work piece by maintaining the work piece 15 cm from the evaporating metal. During this process the indifferent electrode 12 is shielded so that no palladium is deposited thereon but the palladium layer is allowed to make contact with the indifferent electrode. The rate of deposition is slow because of the risk of overheating of the plastic substrate, but thicknesses of up to 0.5 thousandths of an inch have been achieved.

Finally, the unit, with the exception of indifferent electrode, is coated with medical grade silicon elastomer 382 manufactured by Dow Corning.

The invention is not restricted to the details of the foregoing description of one embodiment thereof. For example, the slilcone rubber covering may be omitted. The screening deposit of palladium may be omitted. Furthermore, the indifferent electrode may be deposited on to the assembled unit instead of being moulded into it. In this case it is necessary to provide a metal connection extending through the housing and with which the deposited indifferent electrode makes contact. The base and lid of the housing need not be welded together but may be adhered by means of plastic solvent or adhesive at the interface.

We claim:

1. An implantable cardiac pacer generator comprising a housing formed of two pre-moulded sections of plastic material, sealing means sealing the two sections by a surface seal at the interface, the sealed housing defining at least one cavity, a pulse generating means housed within the at least one cavity, an electrode and an electrode connecting block positioned so that exterior electrical connections may be established thereby, connectors sealed in the sections and making electrical connections between the electrode and the electrode connecting block and the pulse generating means, and a source of electric current housed within the at least one cavity and connected to power the pulse generating means.

2. An implantable cardiac pacer as claimed in claim 1 wherein the plastic material is polypropylene.

3. An implantable cardiac pacer as claimed in claim 1 wherein said electrode is an indifferent electrode of platinium provided on the outer surface of the housing, the indifferent electrode having an upturned rim on which one of the sections is moulded.

4. An implantable cardiac pacer as claimed in claim 1 further comprising a metal layer coated on the plastic surfaces of the assembled housing.

5. An implantable cardiac pacer as claimed in claim 4 wherein the metal layer is palladium.

6. A method of construction of an implantable cardiac pacer generator, the method comprising the steps of: moulding two sections of plastic material on a metal electrode connecting block and connectors while forming at least one cavity in the sections, mounting a pulse generating means in the at least one cavity; mounting a source of electric current in the at least one cavity; connecting the source of electric current and the connectors to the pulse generating means; bringing the two sections together and sealing them at the interface; and connecting an indifferent electrode and said connecting block to said connectors, the indifferent electrode and the connecting block of the finished pacer generator being positioned so that external electrical connections may be established thereby.

7. The method claimed in claim 6 including the steps of clamping the two sections together and heating by the application of ultrasonic energy to effect the seal.

8. The method claimed in claim 6 including the step of heat welding the two sections to effect the seal.

9. The method claimed in claim 8 including the steps of, first, heating and pressing together the interface surfaces of the sections and, second, welding the edge of the interface with a rod of the same plastic material as the sections.

10. A method of construction of an implantable cardiac pacer as claimed in claim 6 wherein the plastic material is polypropylene.

* * * * *